United States Patent
Tisdale et al.

(10) Patent No.: US 7,926,285 B2
(45) Date of Patent: Apr. 19, 2011

(54) MODULAR CHEVRON EXHAUST NOZZLE

(75) Inventors: Rudolph Morris Tisdale, Middletown, OH (US); Gregory Allen Uhler, Fairfield, OH (US); Michael Robert Johnson, Loveland, OH (US); Christopher Joseph Nye, Norwood, OH (US)

(73) Assignee: General Electric Company, Schenectady, NY (US)

( * ) Notice: Subject to any disclaimer, the term of this patent is extended or adjusted under 35 U.S.C. 154(b) by 912 days.

(21) Appl. No.: 11/779,518

(22) Filed: Jul. 18, 2007

(65) Prior Publication Data

US 2009/0019857 A1    Jan. 22, 2009

(51) Int. Cl.
*F02K 1/00* (2006.01)
*B05B 12/00* (2006.01)
(52) U.S. Cl. ..................... 60/770; 239/265.39
(58) Field of Classification Search .............. 60/770, 60/771, 39.5; 239/265.19, 265.39; 181/213
See application file for complete search history.

(56) References Cited

U.S. PATENT DOCUMENTS

| | | | |
|---|---|---|---|
| 3,153,319 A | 10/1964 | Young et al. |
| 3,568,792 A | 3/1971 | Urquhart |
| 4,543,784 A | 10/1985 | Kirker |
| 4,592,201 A | 6/1986 | Dusa et al. |
| 4,754,924 A | 7/1988 | Shannon |
| 4,830,315 A | 5/1989 | Presz et al. |
| 4,836,469 A | 6/1989 | Wagenfeld |
| 5,039,171 A | 8/1991 | Lore |
| 5,402,963 A | 4/1995 | Carey et al. |
| 5,806,302 A | 9/1998 | Cariola et al. |
| 5,908,159 A | 6/1999 | Rudolph |
| 6,314,721 B1 | 11/2001 | Mathews et al. |
| 6,360,528 B1 | 3/2002 | Brausch et al. |
| 6,487,848 B2 | 12/2002 | Zysman et al. |
| 6,532,729 B2 | 3/2003 | Martens et al. |
| 6,568,172 B2 | 5/2003 | Jannetta et al. |
| 6,612,106 B2 | 9/2003 | Balzer |
| 6,658,839 B2 | 12/2003 | Hebert |
| 6,718,752 B2 | 4/2004 | Nesbitt et al. |
| 6,786,037 B2 | 9/2004 | Balzer |
| 6,786,038 B2 | 9/2004 | Lair |
| 6,826,901 B2 | 12/2004 | Hebert |
| 6,935,098 B2 | 8/2005 | Bardagi et al. |
| 7,000,378 B2 | 2/2006 | Birch et al. |
| 7,065,957 B2 | 6/2006 | Balzer |
| 7,093,423 B2 | 8/2006 | Gowda et al. |
| 7,174,704 B2 | 2/2007 | Renggli |

(Continued)

FOREIGN PATENT DOCUMENTS

GB    2146702 A    4/1985

(Continued)

OTHER PUBLICATIONS

U.S. Appl. No. 11/751,174, filed May 21, 2007, Renggli.

(Continued)

*Primary Examiner* — Michael Cuff
*Assistant Examiner* — Gerald L Sung
(74) *Attorney, Agent, or Firm* — William S. Andes; Francis L. Conte

(57) ABSTRACT

An exhaust nozzle for a gas turbine engine includes a modular chevron. The chevron includes dual skins fixedly joined together at a base flange, and at a rim extending along the trailing edge of the chevron between the base and apex thereof.

32 Claims, 6 Drawing Sheets

U.S. PATENT DOCUMENTS

| | | | |
|---|---|---|---|
| 7,174,718 B2 * | 2/2007 | Bonnet et al. | 60/770 |
| 7,216,831 B2 | 5/2007 | Wood | |
| 7,305,817 B2 | 12/2007 | Blodgett et al. | |
| 7,340,883 B2 * | 3/2008 | Wood et al. | 60/226.1 |
| 7,520,124 B2 | 4/2009 | Narayanan et al. | |
| 7,578,132 B2 * | 8/2009 | Webster | 60/770 |
| 7,644,575 B2 * | 1/2010 | Wood et al. | 60/204 |
| 7,721,551 B2 | 5/2010 | Hanson | |
| 7,739,872 B2 * | 6/2010 | Murphy et al. | 60/770 |
| 2002/0125340 A1 * | 9/2002 | Birch et al. | 239/265.11 |
| 2003/0221411 A1 * | 12/2003 | Nesbitt et al. | 60/204 |
| 2005/0081509 A1 | 4/2005 | Johnson | |
| 2005/0172611 A1 | 8/2005 | Blodgett et al. | |
| 2005/0193716 A1 | 9/2005 | Schlinker et al. | |
| 2005/0214107 A1 | 9/2005 | Gutmark et al. | |
| 2006/0053767 A1 | 3/2006 | Seiner | |
| 2006/0101803 A1 * | 5/2006 | White | 60/204 |
| 2006/0101807 A1 | 5/2006 | Wood et al. | |
| 2006/0213198 A1 | 9/2006 | Arbona et al. | |
| 2007/0033922 A1 | 2/2007 | Reba et al. | |
| 2007/0234728 A1 | 10/2007 | Peters | |
| 2008/0120979 A1 * | 5/2008 | Wood et al. | 60/770 |
| 2008/0202847 A1 * | 8/2008 | Porte | 181/213 |
| 2009/0071164 A1 * | 3/2009 | Renggli | 60/770 |
| 2009/0178410 A1 * | 7/2009 | Straza | 60/725 |
| 2009/0320487 A1 * | 12/2009 | Alkislar et al. | 60/771 |
| 2010/0011777 A1 * | 1/2010 | Wood et al. | 60/771 |
| 2010/0018212 A1 * | 1/2010 | Core | 60/771 |

FOREIGN PATENT DOCUMENTS

| | | | |
|---|---|---|---|
| GB | 2289921 A | 12/1995 | |

OTHER PUBLICATIONS

General Electric Company, "CF6-80C2 Conic Nozzle," in public use in USA more than one year before Jun. 1, 2007, single page.

* cited by examiner

MODULAR CHEVRON EXHAUST NOZZLE

BACKGROUND OF THE INVENTION

The present invention relates generally to gas turbine engines, and, more specifically, to exhaust nozzles therein.

In a gas turbine engine, air is pressurized in a compressor and mixed with fuel in a combustor for generating hot combustion gases. Energy is extracted from the gases in a high pressure turbine (HPT) which powers the compressor, and, additional energy is extracted from the gases in a low pressure turbine (LPT) which powers an upstream fan in a turbofan aircraft engine application.

In the turbofan engine, a bypass duct surrounds the core engine and bypasses pressurized fan air through a fan nozzle for providing a large portion of propulsion thrust. Some of the fan air enters the core engine wherein it is further pressurized to generate the hot combustion gases which are discharged through the primary or core exhaust nozzle to provide additional propulsion thrust concentrically inside the surrounding fan air stream.

During takeoff operation of the engine in an aircraft, the high velocity core exhaust and fan exhaust generate significant noise as the exhaust flows mix with the ambient airflow. Noise attenuation in commercial aircraft engines is a significant design objective that may adversely impact engine efficiency, which is the paramount design objective in commercial aircraft.

The typical core and fan exhaust nozzles are conical and taper in diameter aft to thin, annular trailing edges. The nozzles may be single-ply sheet metal, or may be two-ply sheet metal with a honeycomb strengthening core laminated therebetween.

The nozzles are also typically formed as full, or substantially complete, annular rings which enhances their structural rigidity and strength for accommodating the large pressure loads developed during operation as the core and fan exhaust streams are discharged from the engine at high velocity.

A significant advancement in noise attenuation while maintaining aerodynamic efficiency is found in the chevron exhaust nozzle disclosed in U.S. Pat. No. 6,360,528, assigned to the present assignee. In this Patent, a row of triangular chevrons form the exhaust nozzle for enhancing mixing between the high velocity exhaust flow and the lower velocity surrounding stream. The individual chevrons are integrally formed at the aft end of a supporting annular exhaust duct and enjoy the combined structural rigidity and strength therewith.

During continuing development of the chevron exhaust nozzle, two-ply construction of the chevrons is desirable for aerodynamic performance, yet presents significant problems in the manufacture thereof. The two skins should be smooth and flush for maximizing aerodynamic efficiency of the internal and external flow streams, while the serpentine trailing edge of the chevrons should minimize aerodynamic losses as the expanding inner stream is discharged through the corresponding diverging slots between adjacent chevrons.

Furthermore, the unitary configuration of the annular chevrons nozzle increases the difficulty of manufacture since accidental damage or out of specification manufacture of the individual ones of the full row of chevrons can adversely affect performance of the entire chevron nozzle.

Accordingly, it is desired to provide an improved chevron exhaust nozzle for addressing these performance and manufacturing problems.

BRIEF DESCRIPTION OF THE INVENTION

An exhaust nozzle for a gas turbine engine includes a modular chevron. The chevron includes dual skins fixedly joined together at a base flange, and at a rim extending along the trailing edge of the chevron between the base and apex thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
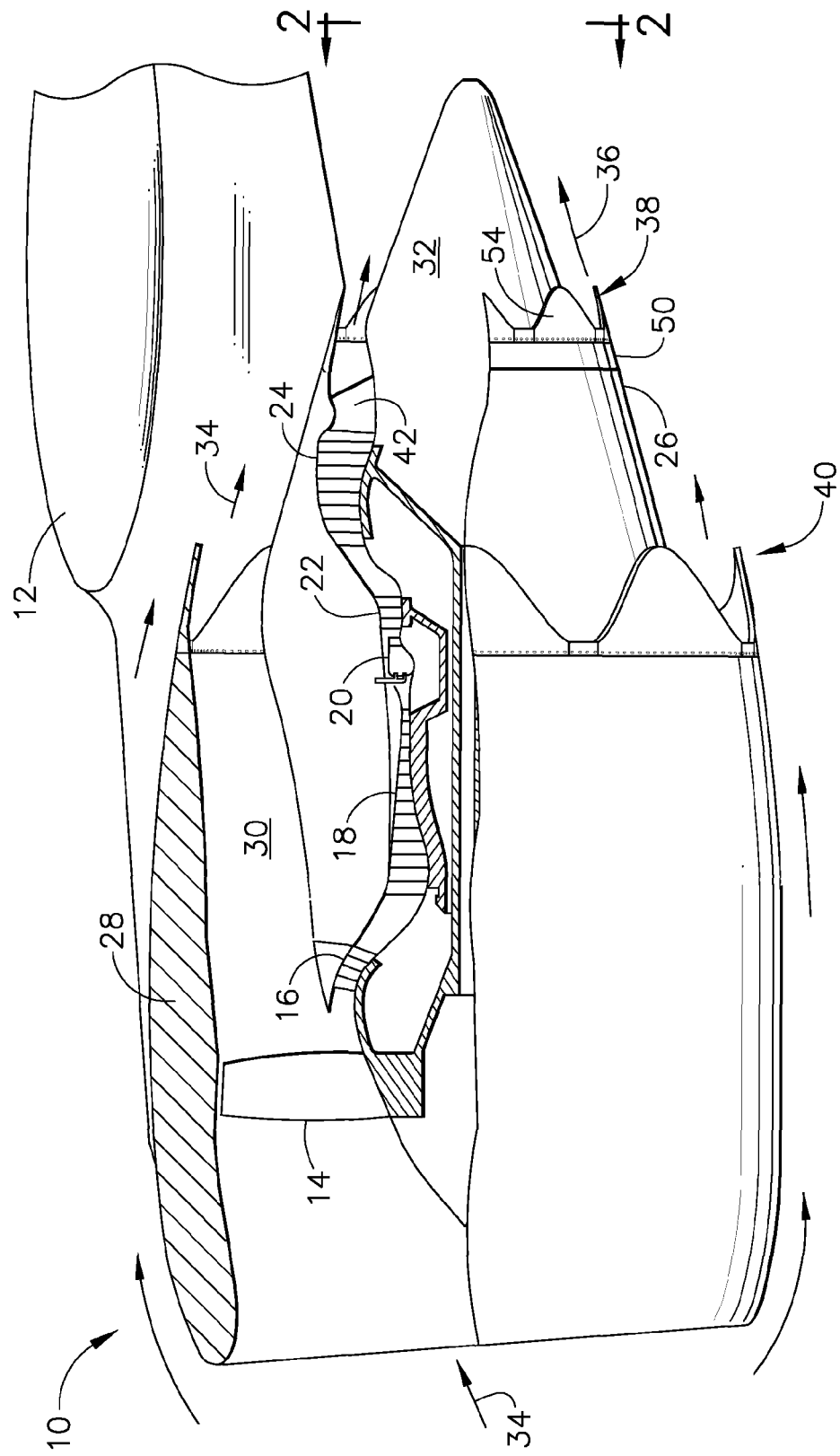
FIG. 1 is a partly sectional, axial schematic view of an exemplary turbofan aircraft engine.

FIG. 1 illustrates an aircraft turbofan gas turbine engine 10 suitably joined to a wing of an aircraft 12 illustrated in part. The engine includes in serial flow communication a fan 14, low pressure compressor 16, high pressure compressor 18, combustor 20, high pressure turbine (HPT) 22, and low pressure turbine (LPT) 24 operatively joined together in a conventional configuration.

The engine also includes a core nacelle or cowl 26 surrounding the core engine and LPT, and a fan nacelle or cowl 28 surrounding the fan and the forward part of the core cowl and spaced radially outwardly therefrom to define a fan bypass duct 30. A conventional centerbody or plug 32 extends aft from the LPT and is spaced radially inwardly from the aft end of the core cowl.

During operation, ambient air 34 flows into the fan 14 as well as around the fan nacelle. The air is pressurized by the fan and discharged through the fan duct as fan exhaust for producing thrust. A portion of the air channeled past the fan is compressed in the core engine and suitably mixed with fuel and ignited for generating hot combustion gases 36 which are discharged from the core engine as core exhaust.

More specifically, the core engine includes a primary or core exhaust nozzle 38 at the aft end thereof which surrounds the center plug 32 for discharging the core exhaust gases. The core nozzle 38 is generally axisymmetric about the axial centerline axis of the engine in the exemplary embodiment illustrated in FIGS. 1 and 2, and defines an improved chevron exhaust nozzle.

If desired, another form of the chevron exhaust nozzle may be used for the fan nozzle 40 at the aft end of the fan nacelle 28 for discharging the pressurized fan air around the core cowl 26 where it also meets and mixes with the ambient airflow as the aircraft is propelled during flight.

Figure 2:
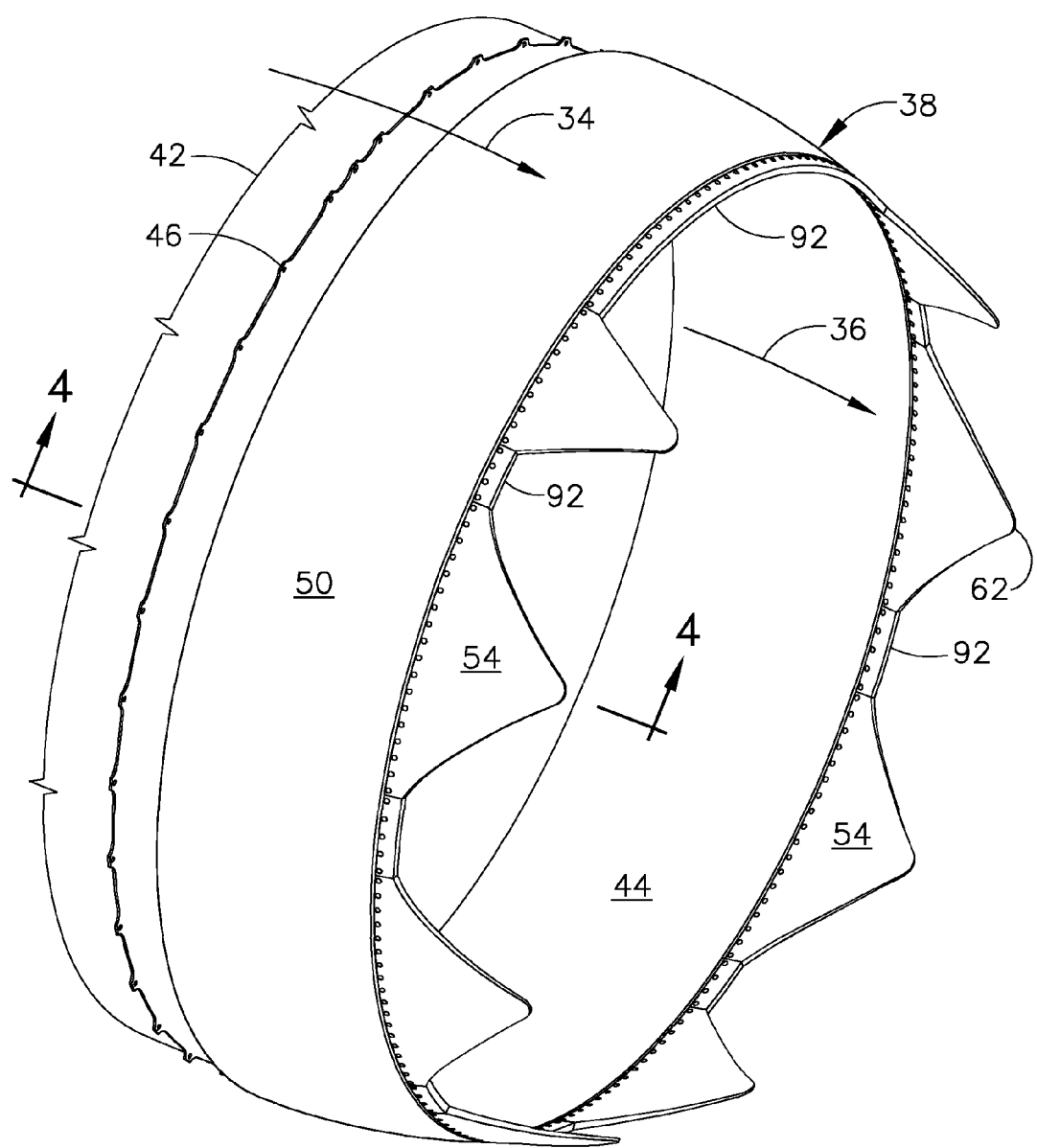
FIG. 2 is an isometric view of the primary core exhaust nozzle of the engine illustrated in FIG. 2 isolated therefrom.
Figure 3:
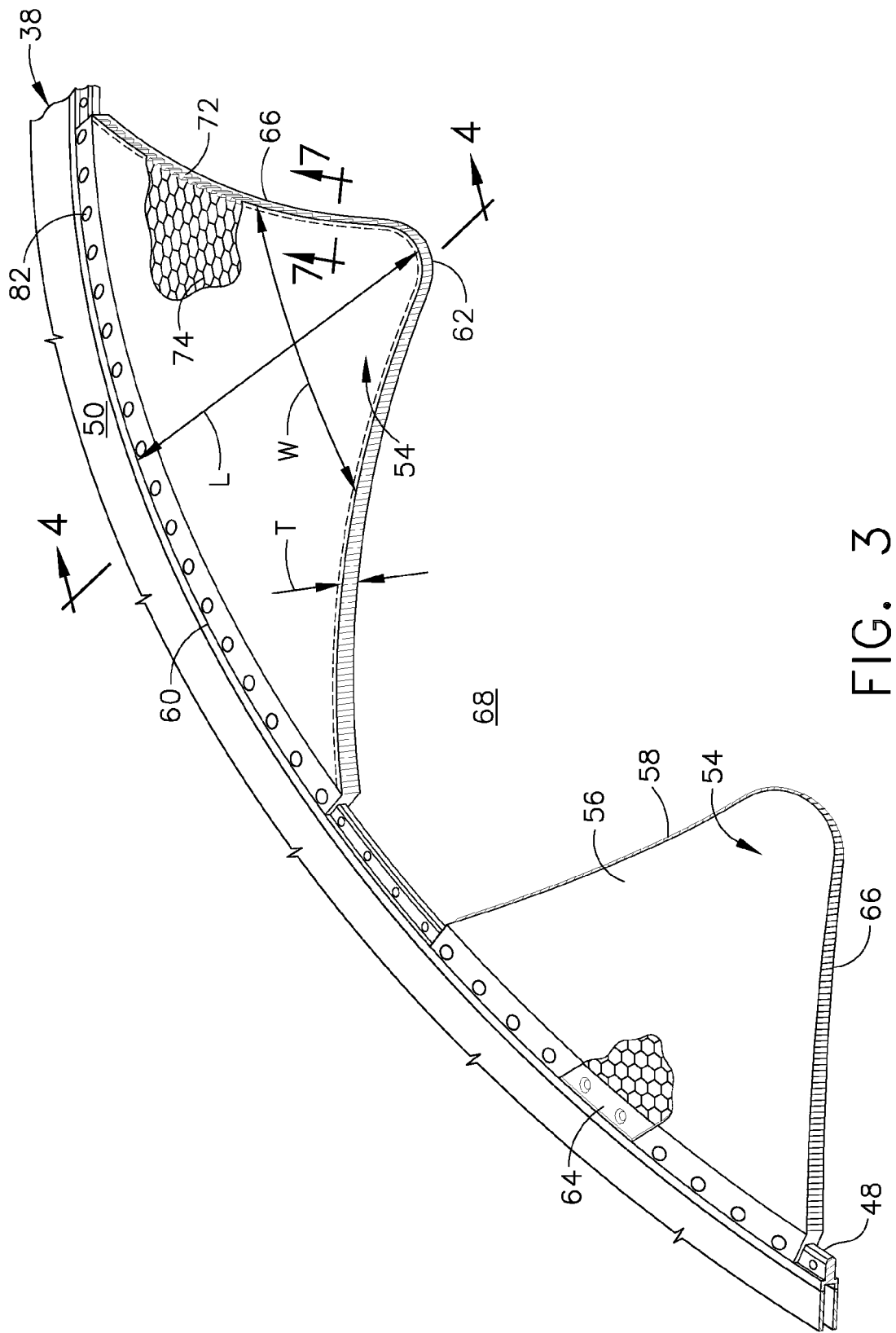
FIG. 3 is an enlarged, partly sectional isometric view of a portion of the exhaust nozzle illustrated in FIG. 2.
Figure 4:
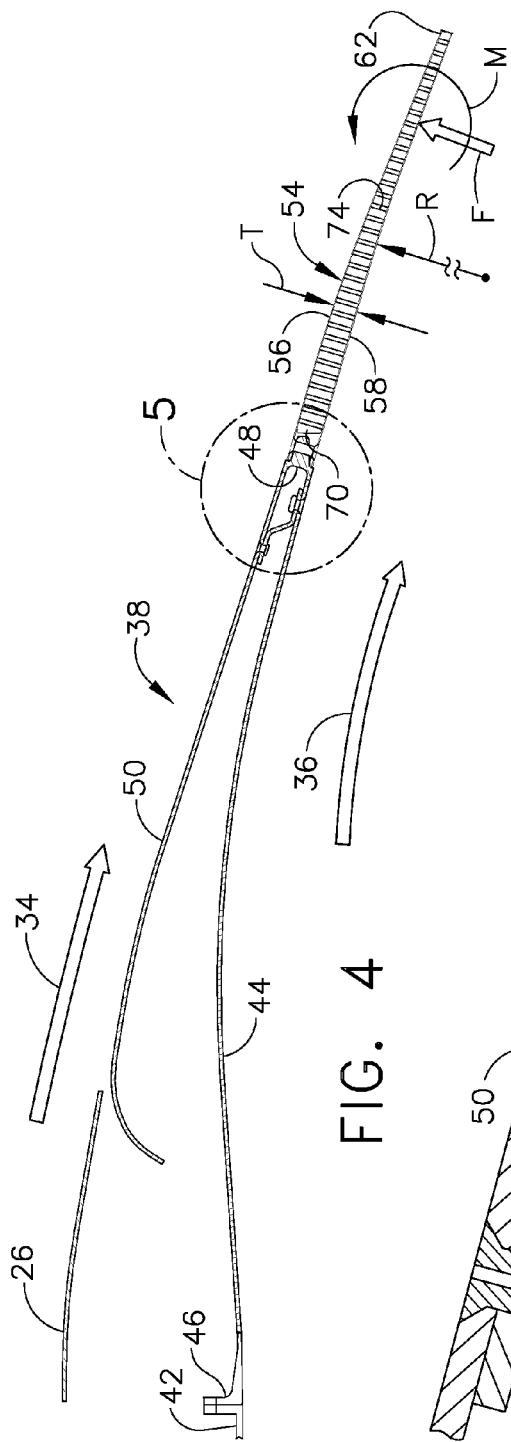
FIG. 4 is an axial sectional view of the exhaust nozzle illustrated in FIGS. 2 and 3 and taken along line 4-4.

The primary exhaust nozzle 38 is illustrated in isolation in FIG. 2, with an enlarged portion thereof being illustrated in FIG. 3, and in transverse, axial view in FIG. 4. And, the primary nozzle 38 is suitably joined to the turbine rear frame 42 as shown in FIG. 1.

More specifically, the nozzle 38 includes an annular exhaust duct 44 having an annular mounting flange 46 integrally formed at the forward end thereof as illustrated in FIGS. 2 and 4. The mounting flange 46 is used to conventionally mount the exhaust duct to a portion of the turbine rear frame 42.

The exhaust duct 44 extends axially aft and terminates in a converging cone portion for discharging the core exhaust 36 around the center plug 32 as shown in FIG. 1. The aft end of the exhaust duct has an annular support flange 48 shown in FIGS. 4, 5, and 6, which increases the structural rigidity and strength of the exhaust duct.

An annular fairing 50 surrounds the duct 44 and is spaced radially outwardly therefrom, and terminates therewith at the common support flange 48. The fairing 50 increases in outer diameter in the upstream direction from the aft support flange 48 and suitably blends flush with the aft end of the core cowl 26 to provide an aerodynamically smooth surface over which the fan air 34 is discharged.

Figure 5:
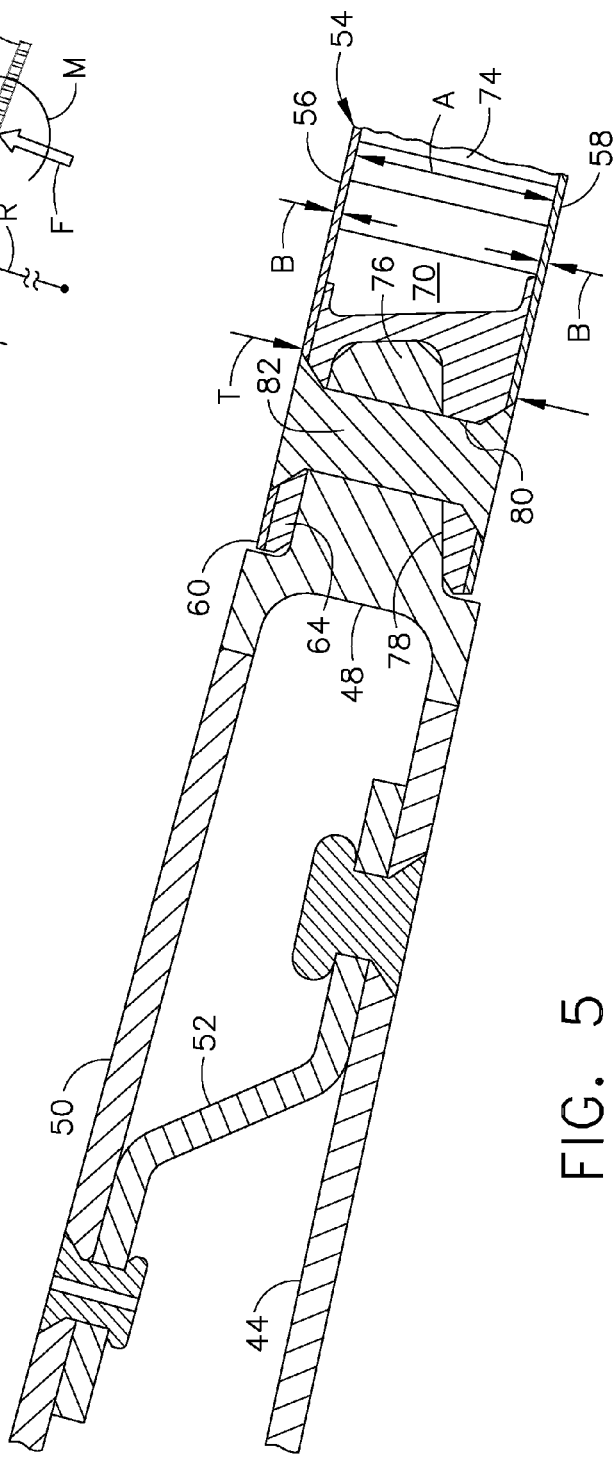
FIG. 5 is an enlarged axial sectional view of a modular chevron joined to an annular supporting flange.

The aft ends of the exhaust duct 44 and the fairing 50 where they join the common annular support flange 48 is best illustrated in FIG. 5. The duct and fairing are made of relatively thick sheet metal of about 63 mils (1.6 mm) thickness and are integrally joined, by welding for example, to corresponding outer and inner legs of the common support flange 48.

The collective assembly of these three elements provides a full annular ring of considerable rigidity and strength, all of these components being suspended in turn from the common mounting flange 46 attached to the turbine rear frame.

FIG. 4 illustrates that the annular exhaust duct 44 is cantilevered aft from the turbine rear frame 42. Correspondingly, the annular fairing 50 is cantilevered forward from the aft support flange 48 and surrounds the exhaust duct 44.

To further enhance the strength of these components, an annular Z-flange 52 extends radially outwardly from the aft end of the exhaust duct 44 at or near the support flange 48 and further extends axially forward to the fairing 50. The flange 52 is riveted along its aft ledge to the exhaust duct 44, and is riveted along its forward ledge to the fairing 50, and further enhances the structural rigidity of the exhaust duct supporting both the fairing 50 itself and the aft support flange 48.

The common annular support flange 48 initially illustrated in part in FIG. 3 provides a convenient and strong support for mounting to the aft end of the exhaust duct a full row of modular chevrons 54 which may be suitably fixedly joined to the support flange 48 in various manners.

FIG. 2 illustrates eight modular chevrons 54 in varying width or size found in the primary nozzle 38, and FIGS. 3 and 4 illustrate common features thereof.

More specifically, each chevron 54 is a dual skin fabrication including a radially outer skin 56 and a radially inner skin 58 having similar triangular configurations. The two skins may be formed of conventional, thin sheet metal for providing smooth aerodynamic surfaces, and are fabricated in individual modular assemblies for enhanced rigidity and strength.

More specifically, each chevron 54 has a circumferentially or laterally wide base end 60 and decreases laterally in width W to a preferably arcuate apex 62 at the opposite aft end thereof to define the triangular profile thereof as illustrated in FIG. 3. The two skins are fixedly joined together on opposite sides of an arcuate base flange 64, by brazing for example, which flange 64 rigidly mounts each chevron to the common support flange 48.

Each chevron 54 illustrated in FIG. 3 therefore commences at the common support flange 48 with a wide base 60 and decreases in width W along the trailing edge 66 thereof which terminates in the preferably round apex 62 at the aft end of the chevron. Correspondingly, as the individual chevrons converge in width in the downstream direction, diverging slots 68 are defined between adjacent chevrons and increase in lateral width in the downstream direction along the opposite portions of opposing trailing edges of the chevrons.

As shown in FIGS. 4 and 5, the two skins 56,58 in each chevron are spaced radially apart to define a hollow core 70 which preferably extends over the entire triangular configuration of the chevron behind the support flange 48. The hollow chevron is preferably bound by a continuous rim 72 shown in the FIG. 3 that extends along the trailing edge 66 of each chevron and defines with the support flange 48 a full perimeter of each chevron between the base and apex. The thin skins 56,58 are therefore rigidly joined together by the rigid base flange 64 and the bounding rigid rim 72.

Each chevron is therefore a modular or unitary assembly of individual subcomponents which may be conveniently manufactured independently of the entire primary nozzle. The individual chevrons share the common modular features of dual skins, support flange, and perimeter rim, yet may conveniently vary in size for maximizing aerodynamic performance of the entire complement of chevrons in the nozzle.

Since each chevron 54 illustrated in FIG. 3 has a triangular configuration for enhanced mixing performance and noise attenuation, they converge laterally in width across the longitudinal or axial length L of the chevron between the wide base 60 and narrow apex 62. Furthermore, each chevron 54 preferably tapers or decreases in radial thickness T between the base flange 48 and the apex 62.

The lateral or circumferential taper is best illustrated in FIG. 3, and the radial or transverse taper is best illustrated in FIG. 4. Since the entire chevron 54 is supported at its upstream base flange 64, it is cantilevered therefrom and the tapered box construction of the dual skins increases rigidity and strength thereof while correspondingly reducing weight.

FIGS. 4 and 5 illustrate exemplary dimensions of each chevron.

The two skins 56,58 are spaced transversely or radially apart at a spacing A inboard or inside of the perimeter defined by the base flange 64 and rim 72 to define the hollow core chamber 70 inside the chevron.

Each skin is preferably thin sheet metal having a nominal thickness B of about 14 mils (0.36 mm) which is substantially thinner than the thickness of the exhaust duct 44 and fairing 50 which integrally support the support flange 48. The height or spacing A of the hollow core is simply the difference of the two skin thicknesses B from the overall chevron thickness T.

Figure 6:
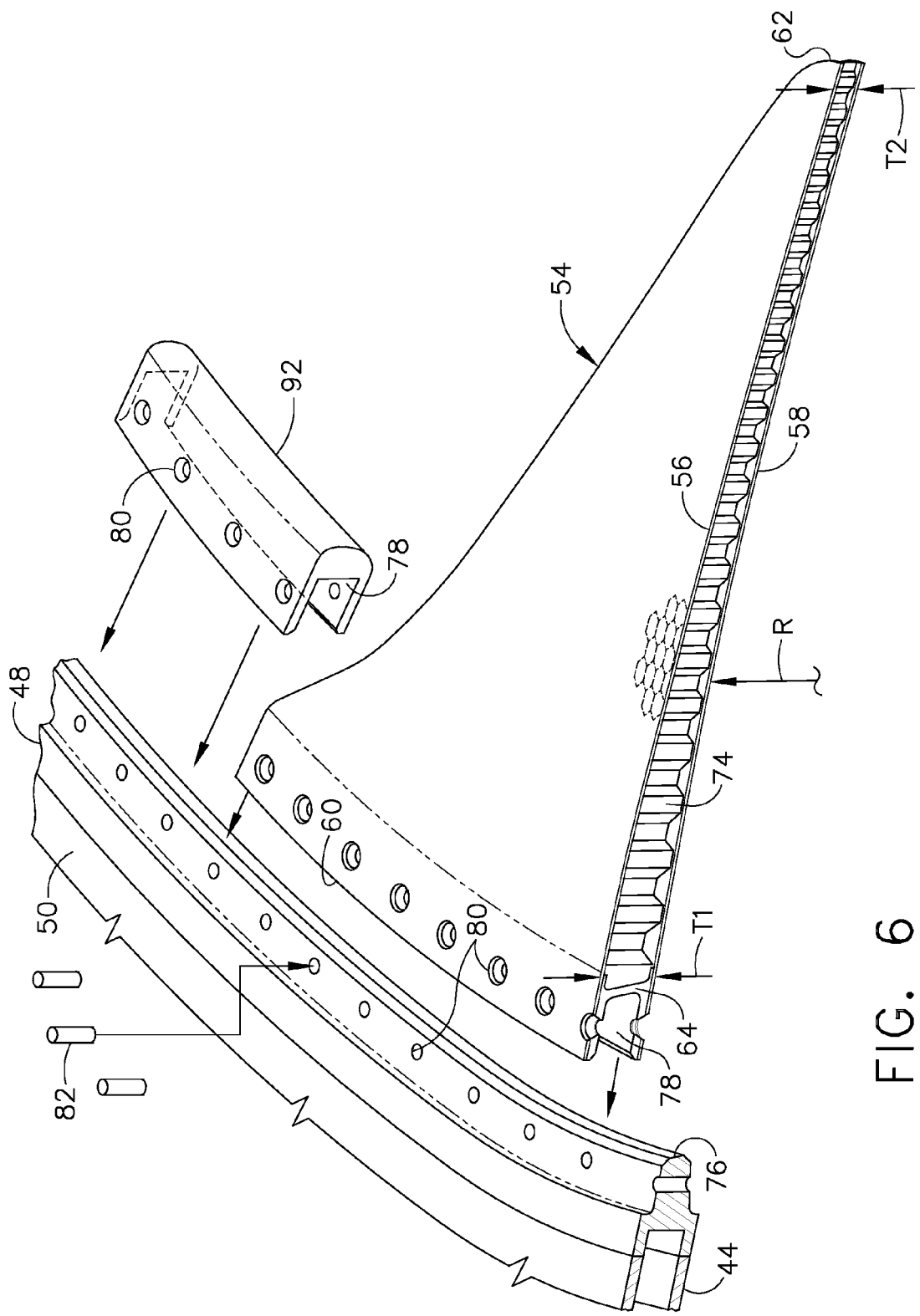
FIG. 6 is an exploded, isometric view of a portion of the chevron exhaust nozzle illustrated in FIG. 3 showing assembly thereof.

And, the thickness T of the chevron has a maximum value T1 as illustrated in FIG. 6 at the base end of the chevron and decreases in thickness to the minimum thickness T2 at the apex 62. The maximum thickness T1 may be about 440 mils (11 mm), and the minimum thickness T2 may be about 100 mils (2.5 mm), with the thickness decreasing smoothly therebetween.

The tapered configuration of the chevron 54 continues upstream along the corresponding skins defining the exhaust duct 44 and fairing 50. The chevron outer skins 56 are preferably aerodynamically flush with the outer surface of the fairing 50 as illustrated in FIGS. 4 and 5, while the chevron inner skins 58 are similarly aerodynamically flush with the inner surface of the upstream exhaust duct 44. The specific configuration of the chevron skins may therefore be used for maximizing aerodynamic performance of the chevrons notwithstanding the varying thickness thereof in the dual skin configuration.

FIG. 5 illustrates the base flange 64 being recessed inside the two skins 56,58 along the chevron base for maintaining the aerodynamically smooth outer and inner flowpath surfaces. FIG. 3 illustrates the rim 72 being recessed slightly inside the two skins 56,58 which aerodynamically closes the two skins along the trailing edge 66 from the base flange 64 and around the apex 62.

In this way, the hollow chevron is fully bound or enclosed around its triangular perimeter in a strong, lightweight box configuration for efficiently carrying aerodynamic pressure loads from the skins to the common base flange 64 thereof.

FIG. 4 illustrates the external flow of the fan exhaust 34 and the internal flow of the core exhaust 36 which produce a net aerodynamic pressure force F on each of the cantilevered chevrons. The pressure force F in turn effects a counterclockwise torque or moment M acting across the chevron which is in turn carried by the base flange 64 thereof.

In FIG. 5, the aerodynamic moment loads are in turn carried from the base flange 64 into the annular support flange 48, and in turn carried upstream along the exhaust duct 44 to the turbine rear frame.

As initially shown in FIG. 3, the modular chevron 54 provides an aerodynamically smooth continuation of the exhaust duct and its surrounding fairing 50 for enjoying the performance and noise attenuation benefits of the original singleply chevron nozzle. In addition, the individual chevrons may be premanufactured and assembled to complete the entire primary nozzle having manufacturing advantages not practical in fully annular or unitary nozzle constructions.

Each chevron 54 illustrated in FIG. 3 is arcuate circumferentially with a corresponding convex outer skin and a concave inner skin.

Furthermore, each chevron may additionally be arcuate in the axial direction for providing the compound arcuate or bowl configuration of the original single-ply chevrons. In particular, the chevron inner skin 58 has a radius of curvature R in the axial plane illustrated so that the inner skin is additionally axially concave as well as circumferentially concave.

Correspondingly, the outer skin 54 is similarly axially convex outwardly in addition to being circumferentially convex outwardly.

The compound curvature of the outer and inner skins 56,58 may be used to advantage for maximizing aerodynamic performance, with the additional design variable of varying the radial thickness T of the chevron between its base or root end where it is mounted on the common support flange 48 to its aft or distal end at the corresponding apex 62.

In the preferred embodiment illustrated in the several Figures, the thickness T of the chevron remains constant in the circumferential direction while varying or tapering thinner in the axial direction between the base and apex ends thereof.

To further enhance the strength of the individual chevrons 54, the hollow core 70 preferably contains a metal honeycomb 74 laminated, by brazing for example, between the dual skins 56,58 as shown in the several Figures. The honeycomb 74 preferably extends over substantially the entire surface area of the laminated skins illustrated in FIG. 3 axially from the base flange 64 aft to the chevron apex 62 and circumferentially between the laterally opposite sides of each chevron along the trailing edge 66 immediately inside the bounding rim 72.

Figure 7:
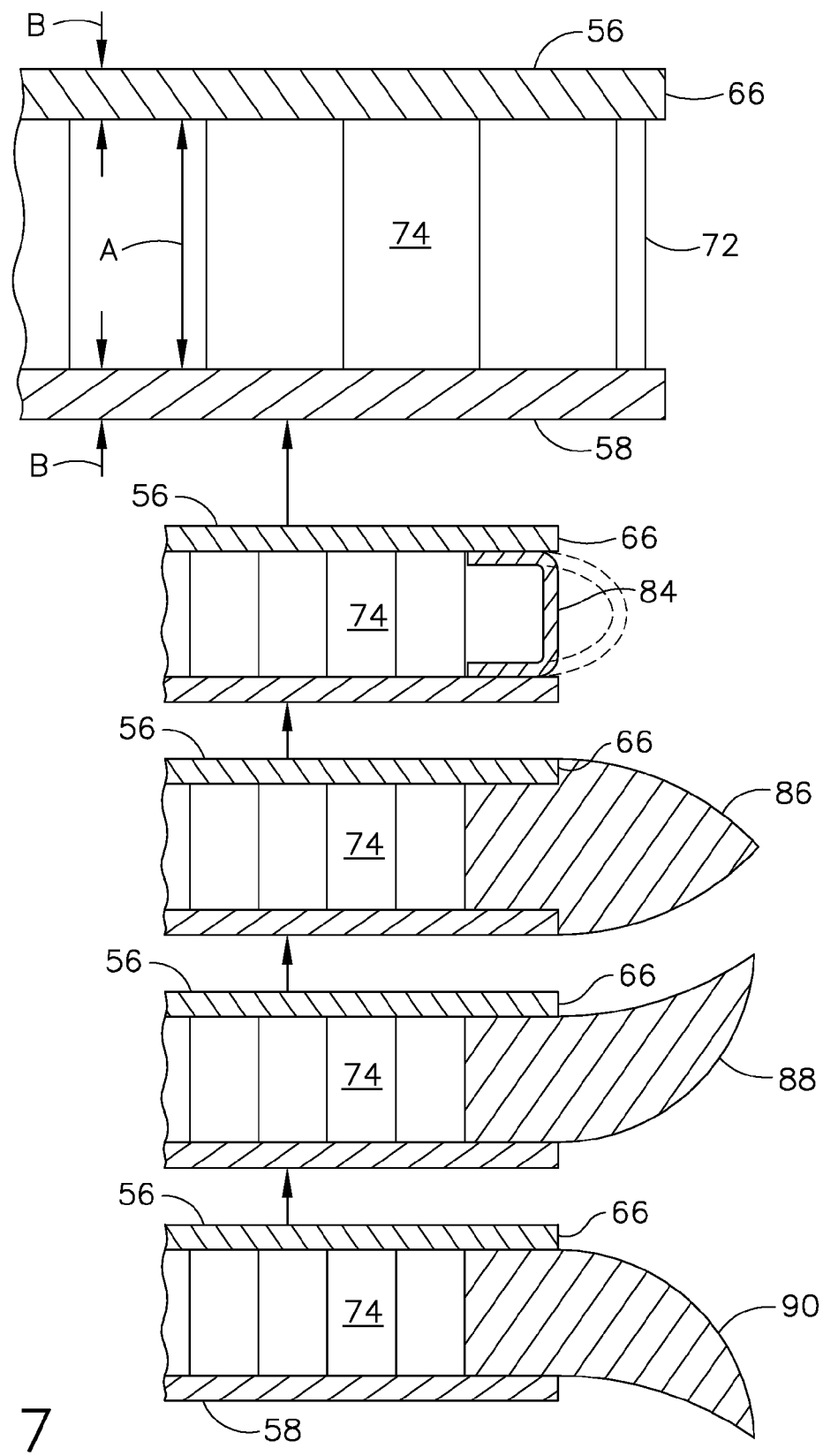
FIG. 7 is a transverse sectional view of the trailing edge portion of the chevron illustrated in FIG. 3 and taken along line 7-7, in conjunction with alternate embodiments thereof.

A preferred embodiment of the chevron rim 72 is illustrated in FIGS. 3 and 7 and includes a strip of half honeycombs facing outboard between the two skins which are smaller in cell size than the cells of the core honeycomb 74. For example, the core honeycomb 74 may have a hexagonal cell size of 250 mils (6.3 mm), whereas the rim honeycomb 72 may have a 16 mil (0.4 mm) cell size using a half cell only strip around the perimeter of the chevron.

The honeycomb core and honeycomb strip rim may be brazed to the outer and inner skins to form a unitary and modular chevron with enhanced rigidity and strength, while still being exceptionally lightweight.

The honeycomb rim 72 illustrated in FIG. 7 is recessed slightly from the chevron trailing edge 66 and provides a relatively smooth aerodynamic closure for the laminated skins 56,58.

Since each of the modular chevrons 54 is independently mounted and cantilevered on the common annular support flange 48 illustrated in FIGS. 2 and 3, the supporting joint therewith is essential for proper operation of the exhaust nozzle and suitable useful life in operation. In a simple embodiment (not shown), the base flange 64 of each chevron could be welded or brazed to the common support flange 48 to provide an integrated or unitary assembly having enhanced strength.

However, it is desired to maintain the modular configuration of the individual chevrons both before and after final assembly thereof. Each chevron may be independently manufactured, and then collectively assembled on the common support flange 48. And, any one or more of the assembled chevrons may also be disassembled from the common support flange 48, if and when desired.

Accordingly, the support flange 48 illustrated in FIGS. 5 and 6 preferably includes an annular tongue 76 extending axially aft from the base end thereof to which are fixedly attached the aft ends of the exhaust duct 44 and fairing 50.

Correspondingly, each of the chevrons 54 includes a circumferentially arcuate U-shaped groove 78 recessed axially aft in the base flange 64 thereof and facing axially forwardly toward the tongue 76. The arcuate groove 78 extends laterally or circumferentially across the full width of the chevron along its base 60. And the tongue 76 and grooves 78 are complementary to each other for forming snug or tight tongue-and-groove joints between the individual chevrons and the common support flange 48.

FIG. 6 illustrates axial assembly of one of the chevrons 54 to engage the groove 78 over the tongue 76, with FIG. 5 showing the final assembly of the joint therebetween. The outer surface of the tongue 76 is preferably conical, whereas the inner surface of the tongue is preferably cylindrical to improve mating of the grooves 78 conforming therewith.

As initially shown in FIG. 6, each of the chevrons 54 includes a row of apertures 80 extending transversely or radially through the skins, base flange 64, and grooves 78 and aligned with corresponding apertures through the support tongue 76. The individual fasteners 82, such as conventional rivets, may be used in each aperture 80 to fixedly and independently mount each of the chevrons on the support flange 48 with the tongue-and-groove joints therewith.

This fastened joint for each of the modular chevrons permits individual assembly thereof, as well as removal thereof if and when desired. Each modular chevron may therefore be independently manufactured and optimized and varied as desired during development and testing, and readily assembled to the common support flange 48 for testing and production use in combination.

And, during production use, the joints securely mount the lightweight chevrons to the common exhaust duct and effectively carry the aerodynamic pressure and moment loads from the chevrons, through the joints at the support flange 48 and through the exhaust duct to the supporting turbine rear frame.

The base flange 64 illustrated in FIG. 6 may be a machined component having enhanced structural rigidity and strength for supporting applied loads on the chevron skins. The base flange closes the base leg of the triangular chevron. And, the perimeter rim 72 closes the side legs of the chevron along the serpentine trailing edge.

FIG. 7 illustrates the relatively simple honeycomb strip rim 72 closing the trailing edge 66 of the chevron outer and inner skins 56,58.

FIG. 7 also illustrates alternate embodiments of the perimeter rims having different configurations, advantages, and production costs.

More specifically, in a second embodiment also illustrated in FIG. 7, the perimeter rim, designated 84, is in the form of a bent sheet metal strip fixedly bridging closed the two skins 56,58 along the trailing edge 66. The rim 84 is preferably bowed laterally outwardly and has a generally U-shaped square configuration shown in solid line. However, the sectional profile of the rim 84 may vary as desired, such as the semicircular configuration shown in phantom line, for enhancing aerodynamic performance as development tests indicate.

FIG. 7 illustrates three additional embodiments of suitable rims, designated 86,88,90 which share the solid, machined construction thereof instead of being thin sheet metal. These three embodiments extend in a knife-edge laterally outwardly from the dual skins 56,58 along the trailing edge 66 between the base and apex of the chevron.

The third rim 86 converges symmetrically outwardly to the knife-edge, and also includes side notches to blend flush with the exposed surfaces of the outer and inner skins 56,58.

The fourth rim 88 bows radially outwardly toward the outer skin 56 in a asymmetric, concave upwardly and convex downwardly knife-edge.

The fifth rim 90, in contrast, bows radially inwardly toward the inner skin 58 in an opposite, asymmetric configuration being concave radially inwardly and convex radially outwardly.

The five different embodiments of the rims 72,84,86,88, and 90 illustrated together in FIG. 7 similarly share the recessed mounting thereof between the dual skins, and may be conveniently laminated therewith by brazing, for example. The rims thusly fully enclose the perimeter of each modular chevron and provide both structural reinforcement of the thin skins as well as enhanced aerodynamic performance of the chevrons in accordance with different design requirements.

The machined rims 86-90 correspondingly add weight and require more expensive manufacture than the simple sheet metal configurations of the rims 72 and 84. Manufacturing cost may be offset against the specific advantages and disadvantages of the different designs of rim closeouts.

The common annular support flange 48 found in the primary nozzle 38 illustrated in FIG. 2 permits convenient modification of the nozzle design by simply substituting or installing different forms of the individual modular chevrons 54. In the FIG. 2 embodiment, eight modular chevrons are found in the single nozzle, with three different sizes repeating in pairs on opposite lateral sides of the nozzle from top to bottom.

The top of the nozzle is specifically configured for being mounted below the supporting pylon under the aircraft wing and therefore is devoid of any chevron at this top position. The top pair of chevrons have minimum width. The middle two pairs of chevrons have maximum width. And, the bottom pair of chevrons have intermediate width.

The modular configuration of the chevrons 54 illustrated in FIG. 2 also permit not only selective location of the individual chevrons around the circumference of the nozzle relative to the upper pylon position, but also different circumferential spacing therebetween as desired.

For example, the individual chevrons 54 may be circumferentially spaced apart from each other, with the intervening circumferential spaces therebetween being suitably filled by corresponding aerodynamic filler segments 92. The individual fillers 92 correspondingly separate circumferentially adjacent chevrons 54 and suitably cover the otherwise exposed support flange 48.

As best shown in FIG. 6, each of the fillers 92 is an arcuate machined component having a circumferentially arcuate groove 78 of identical profile to the groove 78 in the base flanges 64 for identically creating the same tongue-and-groove joints with the support tongue 76 over which the filler is mounted.

Like the chevrons 54, the fillers 92 also include a row of the radial apertures 80 which mate with corresponding apertures in the support tongue 76 through which the rivet fasteners 82 are again used to secure the fillers to the common support flange 48.

The individual fillers 92 illustrated in FIG. 6 preferably conform or match the total thickness of the chevrons 54 at the base flanges 64 thereof. And, each filler 92 as illustrated in FIG. 2 terminates axially aft directly at or near the support flange 48 to define the forwardmost end of the diverging slot 68 which increases in circumferential width from the fillers 92 aft to the chevron apexes 62.

An additional advantage of the fillers 92 is that they permit the triangular configuration of the individual chevrons 54 illustrated in FIG. 6 to terminate in square corners at the base flange 64 instead of at triangular or acute angle corners. Since all of the aerodynamic loads on the entirety of the individual chevron 54 must be carried through the skins and base flange 64 to the support flange 76, the base end of the chevron is subject to corresponding stress. By utilizing square corners at both ends of the chevron base, those stresses may be substantially reduced as compared with acute-angle corners at opposite ends of the base flange.

The individual fillers 92 may therefore have square corners at the circumferentially opposite ends thereof which conform or match the square corners at the opposite ends of the chevron bases. Stresses are therefore reduced, and aerodynamic performance is enhanced by the cooperation of the separated chevrons and small filler pieces therebetween.

The aft edge of the fillers 92 may have any suitable profile for maximizing aerodynamic performance and minimizing boat-tail drag. FIG. 6 illustrates a convex bullnose configuration for the aft edge of the filler 92, but the filler may have other configurations as development testing dictates.

The modular configuration of the individual chevrons 54 disclosed above provides strong, lightweight chevron modules which may be conveniently and economically premanufactured individually for later assembly. The common support flange 48 provides a fully annular supporting structure having enhanced rigidity and strength to which the individual modular chevrons may be attached or removed as desired.

For development testing, the convenience of independently manufacturing individual chevrons having different configurations may be used to advantage in assembling exhaust nozzles having different configurations which may be readily tested and evaluated.

In a commercial modular exhaust nozzle, individual chevrons may be removed and replaced during their useful life in the event of any damage thereto, without requiring complete removal and replacement of the entire exhaust nozzle.

The chevrons in the exhaust nozzle may be individually modular and individually removable, or may be otherwise arranged in modular groups of two or more integral chevrons over the full perimeter of the nozzle, instead of a single annular chevron nozzle.

In this way, each removable chevron module may include one, two, or more discrete chevrons in a common unitary subassembly independently attached to the common support flange 48. And, each module may be separately manufactured to include one or more of the chevrons therein.

The modular configuration of the chevrons also permits the use of different materials in the fabrication thereof, from the preferred metal configuration disclosed above to advanced composite materials if desired.

The various embodiments of the modular chevrons disclosed above may be used to particular advantage in the primary core exhaust nozzle 38 illustrated in FIG. 1, with the fan nozzle 40 being similarly configured if desired, or using the single-ply configuration of the original chevron exhaust nozzle design. The primary nozzle is subject to the heat of the hot exhaust flow, and is therefore formed of suitable metal alloys for withstanding the hostile environment thereof. The fan nozzle 40 is subject to relatively cool pressurized fan air, and may be formed of any suitable material, including metal as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. An exhaust nozzle comprising:
   an annular exhaust duct having a mounting flange at a forward end and an annular support flange at an opposite, aft end; and
   a row of modular chevrons each comprising radially outer and inner skins fixedly joined together at a base flange, and converging circumferentially in width to an opposite apex, with said base flange being disposed between said skins and fixedly joined to said support flange.

2. A nozzle according to claim 1 wherein each of said skins is further fixedly joined together at a rim extending between said base flange and said apex and closing said skins therebetween for carrying aerodynamic pressure loads from said skins to said base flange.

3. A nozzle according to claim 1 wherein:
   said skins are spaced apart radially to define a hollow core and are bound by a perimeter rim extending along a trailing edge of each chevron; and
   adjacent chevrons are spaced apart circumferentially to define diverging slots.

4. A nozzle according to claim 3 wherein each chevron tapers in radial thickness between said base flange and apex.

5. A nozzle according to claim 4 wherein said chevron core contains a honeycomb laminated between said skins.

6. A nozzle according to claim 5 wherein said chevron rim comprises a sheet metal strip bridging closed said skins along said trailing edge around said core honeycomb.

7. A nozzle according to claim 4 wherein:
   said support flange comprises an annular tongue extending axially aft;
   each of said chevrons includes a circumferentially arcuate groove recessed axially aft in said base flange thereof; and
   said modular chevrons are independently mounted on said support flange with tongue-and-groove joints therewith.

8. A nozzle according to claim 4 wherein said rim is recessed inside said outer and inner skins of said chevrons and fixedly joined thereto.

9. A nozzle according to claim 4 further comprising a plurality of fillers fixedly joined to said support flange and correspondingly separating circumferentially adjacent chevrons.

10. A nozzle according to claim 4 further comprising:
    an annular fairing surrounding said duct and terminating at said support flange aerodynamically flush with said chevron outer skins; and
    a Z-flange extending from said exhaust duct at said support flange and radially outwardly and forward to said fairing.

11. An exhaust nozzle comprising:
    a modular chevron including outer and inner skins converging along a trailing edge between a base and an opposite apex; and
    said skins being fixedly joined together at a base flange disposed between said skins, and
    at a rim disposed between said skins and extending along said trailing edge between said base and apex.

12. A nozzle according to claim 11 wherein said base flange is recessed between said skins along said chevron base, and said rim closes said skins along said trailing edge from said base flange and around said apex for carrying aerodynamic pressure loads from said skins to said base flange.

13. A nozzle according to claim 12 wherein said skins are spaced transversely apart inboard of said base flange and rim to define a hollow core inside said chevron.

14. A nozzle according to claim 13 wherein said chevron converges both in lateral width and transverse thickness longitudinally between said base and apex.

15. A nozzle according to claim 14 wherein said outer and inner skins are longitudinally convex and concave, respectively, between said base and apex.

16. A nozzle according to claim 14 wherein said chevron core contains a honeycomb laminated between said skins.

17. A nozzle according to claim 16 wherein said chevron rim comprises a sheet metal strip bridging closed said skins along said trailing edge.

18. A nozzle according to claim 14 wherein said base flange comprises an arcuate groove extending laterally across the width of said chevron along said base.

19. A nozzle according to claim 18 wherein said chevron includes a row of apertures extending transversely through said skins and said base flange along said groove.

20. A nozzle according to claim 14 wherein said chevron rim comprises a bowed strip bridging closed said skins along said trailing edge.

21. A nozzle according to claim 14 wherein said chevron rim comprises a solid knife-edge extending laterally outwardly from said skins along said trailing edge.

22. A nozzle according to claim 21 wherein said rim converges symmetrically outwardly to said knife-edge.

23. A nozzle according to claim 21 wherein said rim bows outwardly toward said outer skin.

24. A nozzle according to claim 21 wherein said rim bows inwardly toward said inner skin.

25. A nozzle according to claim 14 further comprising:
    an arcuate support flange; and a row of said modular chevrons fixedly joined at corresponding base flanges thereof to said support flange.

26. A nozzle according to claim 25 wherein:
said base flange comprises a circumferentially arcuate groove extending laterally across the width of each of said chevrons along said bases thereof; and
said support flange comprises a circumferentially arcuate tongue fixedly disposed inside said chevron grooves.

27. A nozzle according to claim 26 wherein said support tongue and row of chevrons at said base flanges thereof include a row of apertures extending transversely therethrough and having corresponding fasteners fixedly joining said chevrons to said support flange.

28. A nozzle according to claim 26 further comprising a plurality of fillers correspondingly separating circumferentially adjacent chevrons.

29. A nozzle according to claim 28 wherein each of said fillers includes an arcuate groove fixedly mounted to said support tongue circumferentially between adjacent chevrons.

30. A nozzle according to claim 29 wherein said fillers conform in thickness with said chevrons at said base flanges thereof, and terminate at said support flange to define diverging slots increasing in circumferential width from said fillers aft to said chevron apexes.

31. A nozzle according to claim 26 further comprising:
an annular exhaust duct terminating at said support flange; and
an annular fairing surrounding said duct and also terminating at said support flange.

32. A nozzle according to claim 31 further comprising:
a mounting flange integrally formed at a forward end of said exhaust duct; and
a Z-flange extending from said exhaust duct at said support flange and radially outwardly and forward to said fairing.

\* \* \* \* \*